United States Patent
Yu et al.

(10) Patent No.: US 12,283,876 B2
(45) Date of Patent: Apr. 22, 2025

(54) POWER CONVERTER WITH INTEGRATED MULTI-PHASE RECONFIGURABLE CURRENT BALANCING

(71) Applicant: pSemi Corporation, San Diego, CA (US)

(72) Inventors: Tim Wen Hui Yu, Fremont, CA (US); Gregory Szczeszynski, Nashua, NH (US)

(73) Assignee: pSemi Corporation, San Diego, CA (US)

( * ) Notice: Subject to any disclaimer, the term of this patent is extended or adjusted under 35 U.S.C. 154(b) by 103 days.

(21) Appl. No.: 17/679,572

(22) Filed: Feb. 24, 2022

(65) Prior Publication Data
US 2023/0268836 A1  Aug. 24, 2023

(51) Int. Cl.
*H02M 1/00* (2007.01)
*H02M 3/158* (2006.01)

(52) U.S. Cl.
CPC ....... *H02M 1/0009* (2021.05); *H02M 3/1584* (2013.01)

(58) Field of Classification Search
CPC .. H02M 3/1584; H02M 1/0083; H02M 1/009; H02M 1/0009; H02M 1/0016; H02M 1/0025
See application file for complete search history.

(56) References Cited

U.S. PATENT DOCUMENTS

| | | | |
|---|---|---|---|
| 7,408,390 B2* | 8/2008 | Yamada | H03F 3/45192 327/124 |
| 2015/0091535 A1* | 4/2015 | Fan | H02M 3/1584 323/234 |

(Continued)

FOREIGN PATENT DOCUMENTS

| | | |
|---|---|---|
| JP | 2006-322711 | 11/2006 |
| JP | 2010-259257 | 11/2010 |
| KR | 10-1744740 | 6/2017 |

OTHER PUBLICATIONS

Jang, Gi Jeong, International Search Report and Written Opinion received from KIPO dated Jun. 15, 2023 for appln. No. PCT/US2023/062902, 12 pgs.

*Primary Examiner* — Gustavo A Rosario-Benitez
(74) *Attorney, Agent, or Firm* — Haynes and Boone, LLP (57) ABSTRACT

Circuits and methods for sensing output current of a power converter, controlling output current in multiple parallel power converters, and enabling reconfigurability of output control for multiple parallel power converters. One embodiment includes a current sensing circuit configured to be coupled to a power converter, the current sensing circuit configured to receive a first voltage representative of an output current of the power converter and output a low-frequency filtered second voltage based on the first voltage and a high-frequency filtered third voltage based on the first voltage. In some embodiments, the first voltage is generated by sensing an output current of the power converter and converting the sensed output current to the first voltage. Other embodiments include a plurality of power stages and corresponding current sensing circuits, wherein the outputs of the low-frequency filters of the current sensing circuits are coupled in common.

12 Claims, 10 Drawing Sheets

(56) References Cited

U.S. PATENT DOCUMENTS

| | | | | |
|---|---|---|---|---|
| 2016/0087531 A1* | 3/2016 | Zhang | ................. | H02M 3/1582 |
| | | | | 323/271 |
| 2016/0248328 A1* | 8/2016 | Zhang | .................... | H02M 1/08 |
| 2018/0248479 A1* | 8/2018 | Fan | ....................... | H02M 5/458 |
| 2020/0403495 A1* | 12/2020 | Lu | ....................... | H02M 3/1563 |
| 2021/0391780 A1 | 12/2021 | He et al. | | |
| 2022/0115955 A1* | 4/2022 | Yan | .................... | H02M 3/1588 |
| 2022/0376600 A1* | 11/2022 | Jong | ................. | H02M 1/0009 |
| 2023/0188035 A1* | 6/2023 | Bolus | .................. | H02M 3/158 |
| | | | | 323/271 |

* cited by examiner

POWER CONVERTER WITH INTEGRATED MULTI-PHASE RECONFIGURABLE CURRENT BALANCING

BACKGROUND

(1) Technical Field

This invention relates to electronic circuits, and more particularly to power converter circuits, including DC-DC power converter circuits.

(2) Background

Many electronic products, particularly mobile computing and/or communication products and components (e.g., cell phones, notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-2V). Still other circuitry may require an intermediate voltage level (e.g., 5-10V).

Power converters are often used to generate a lower or higher voltage from a common power source, such as a battery. Power converters include DC-DC or AC-DC converters. One type of power converter comprises a converter circuit, control circuitry, and auxiliary circuitry such as bias voltage generator(s), a clock generator, a voltage regulator, a voltage control circuit, etc. Power converters which generate a lower output voltage level from a higher input voltage power source are commonly known as buck converters, so-called because $V_{OUT}$ is less than $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter or a boost converter depending on which terminals are used for input and output. Some power converters may provide an inverted output.

Figure 1:
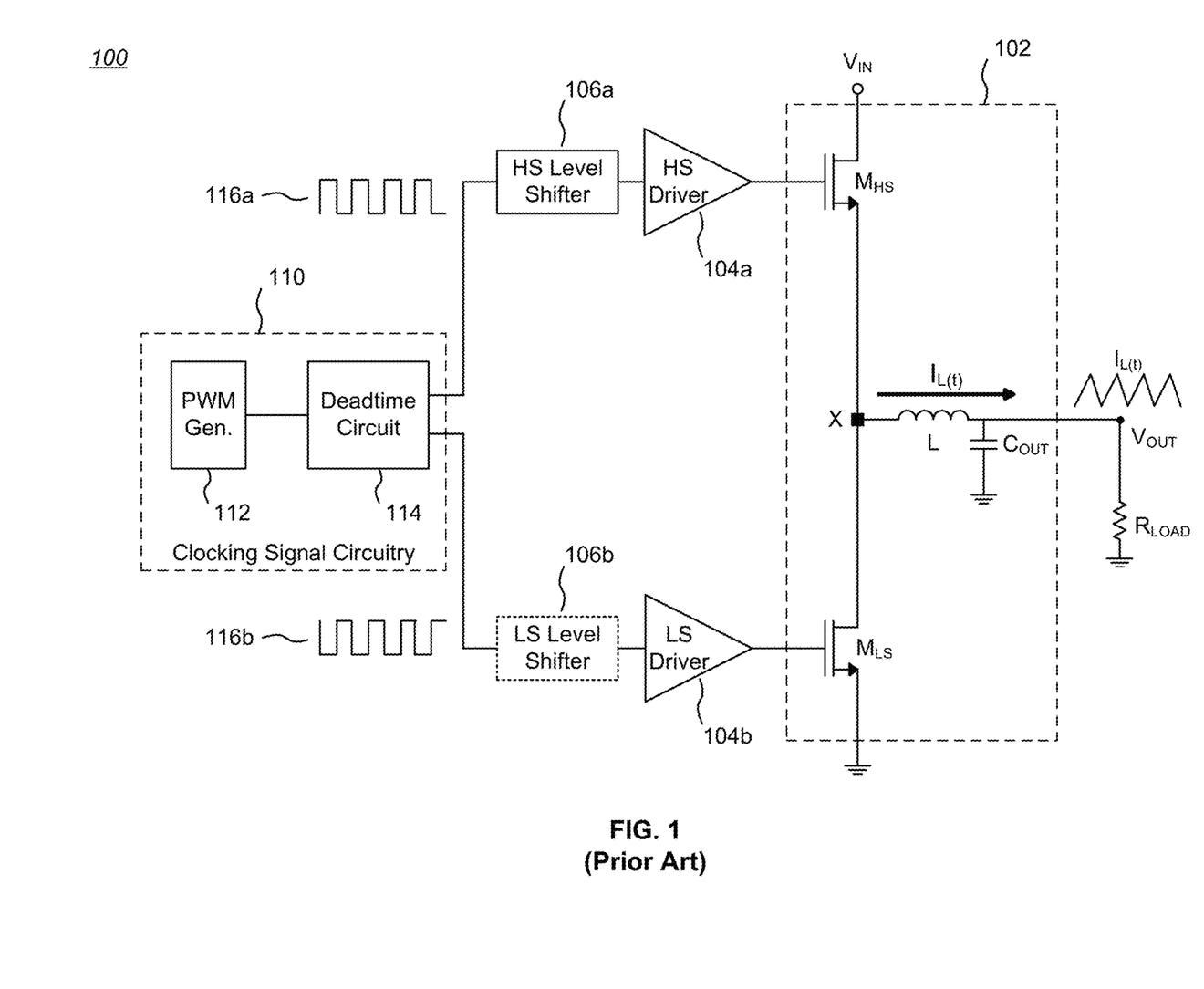
FIG. 1 is a block diagram of one example of a prior art buck power converter.

FIG. 1 is a block diagram of one example of a prior art buck power converter 100. A half-bridge power stage 102 comprises a "high side" power device (e.g., a MOSFET) $M_{HS}$ and "low side" power device $M_{LS}$ coupled to an inductor L and output capacitor $C_{OUT}$. A voltage $V_{IN}$ applied to $M_{HS}$ is converted by the half-bridge power stage 102 in known fashion to a lower output voltage $V_{OUT}$ that may be applied to a coupled load (represented as a resistor $R_{LOAD}$ in this example). The half-bridge power stage 102 generates a time-varying current, $I_{L(t)}$, at its output, as indicated by the arrow and symbolic saw-tooth waveform in FIG. 1.

The control inputs (e.g., FET gates) of both power devices $M_{HS}$, $M_{LS}$ are driven by respective high-side and low-side drivers 104a, 104b. The input to the drivers 104a, 104b are from respective level shifters 108a, 108b which convert a logic level input signal (e.g., 0V=binary 0, 5V=binary 1) to a shifted range of voltages suitable for the voltage conditions of the drivers 104a, 104b (the low side driver 104b is referenced to fixed reference potential, such as ground, but the high side driver 104a is referenced to the varying voltage present at node X). In some embodiments, the low side level shifter 106b may not be necessary.

Clocking signal circuitry 110 provides a set of time-varying control signals to the level shifters 106a, 106b that regulate the ON-OFF duty cycle of the power devices $M_{HS}$, $M_{LS}$. In the illustrated example, the clocking signal circuitry 110 includes a pulse-width modulation (PWM) signal generator 112 the generates a PWM signal in response to the power requirements of the load (which typically vary over time); according, generally $V_{OUT}$ is tied to the clocking signal circuitry 110, directly or indirectly, to provide feedback regarding the load power draw (the feedback loop is not shown). The PWM signal in this example is coupled to a conventional deadtime circuit 114. The deadtime circuit 114 outputs complementary versions 116a, 116b of the PWM signal to the power devices $M_{HS}$, $M_{LS}$, with a slight modification to the respective complementary PWM signals to insure a deadtime between when both power devices $M_{HS}$, $M_{LS}$ are turned ON, in order to avoid "shoot through" from $V_{IN}$ to ground.

It should be understood that the half-bridge power stage 102 is illustrative only. More generally, a power converter may include more than two power devices $M_{HS}$, $M_{LS}$, and may en-compass a variety of well-known power converter architectures, particularly multi-level power converter circuits.

In some applications, such as electric vehicles, not only is voltage conversion needed, but high current flow (e.g., 30-40 amps) is required as well. There is often a practical limit to the amount of current, $I_{L(t)}$, that one power converter can supply, so in some applications multiple power converters may be coupled in parallel. However, such an architecture introduces problems, particularly regarding balancing current flow among the parallel constituent power stages in order to improve overall efficiency and prevent over-current damage to one or more power stages.

SUMMARY

The present invention encompasses circuits and methods for sensing output current of a power converter, controlling output current in multiple parallel power converters, and enabling reconfigurability of output control for multiple parallel power converters. Such circuits and methods are particularly useful for balancing current flow among parallel power stages in order to improve overall efficiency and prevent over-current damage to one or more power stages.

One embodiment includes a current sensing circuit configured to be coupled to a power converter, the current sensing circuit configured to receive a first voltage representative of an output current of the power converter and output a low-frequency filtered second voltage based on the first voltage and a high-frequency filtered third voltage based on the first voltage, where "low" and "high" are relative to each other.

Another embodiment includes a current sensing circuit configured to be coupled to a power converter, the current sensing circuit configured to sense an output current of the power converter, convert the sensed output current to a first voltage, and output a low-frequency filtered second voltage based on the first voltage and a high-frequency filtered third voltage based on the first voltage. Another embodiment includes a power converter coupled to such a current sensing circuit.

Yet another embodiment includes a power converter including a plurality of power stages each configured to output a current in response to control signals, and a plurality of corresponding current sensing circuits, wherein the outputs of the low-frequency filters of the plurality of current sensing circuits are coupled in common, including through a switch array.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods for sensing output current of a power converter, controlling output current in multiple parallel power converters, and enabling reconfigurability of output control for multiple parallel power converters. Such circuits and methods are particularly useful for balancing current flow among parallel power stages in order to improve overall efficiency and prevent over-current damage to one or more power stages.

Current Sensing Circuit

Figure 2A:
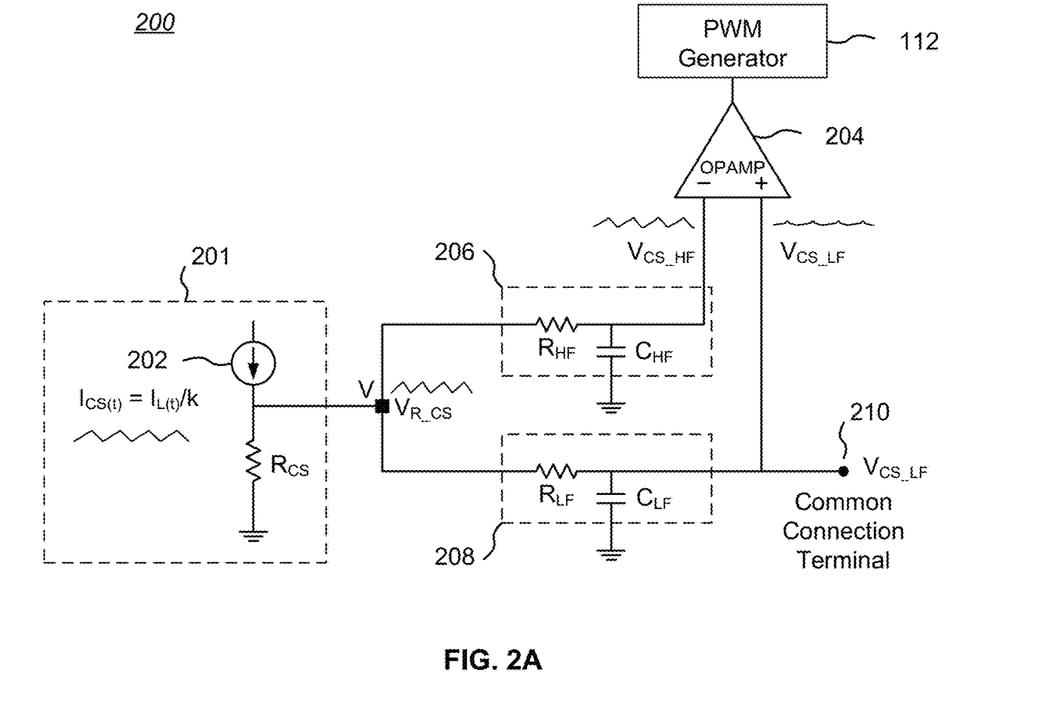
FIG. 2A is a schematic diagram of one embodiment of a novel output current sensing circuit for a power converter.

FIG. 2A is a schematic diagram of one embodiment of a novel output current sensing circuit 200 for a power converter. The power converter may be a buck, boost, or buck-boost power converter, and may be like the type shown in FIG. 1 or may be any of a variety of well-known power converter architectures, including multi-level power converter circuits.

In the illustrated example, a current-to-voltage circuit 201 provides a voltage at a node V that is proportional to the output current of a coupled power stage. In one embodiment of the current-to-voltage circuit 201, a current source 202 provides a time-varying current $I_{CS(t)}$ (represented as an adjacent symbolic saw-tooth waveform in FIG. 2A) that is proportional (e.g., 1/k) to the time-varying output current, $I_{L(t)}$, of a coupled power stage. The current source 202 may be implemented in a number of known ways. For example, a replica device (e.g., a MOSFET, not shown) having essentially the same electrical characteristics as an associated power device (e.g., $M_{HS}$ and/or $M_{LS}$ in FIG. 1) but generally scaled down in size (e.g., 1/10) may be coupled in parallel with one of the power devices. In a form of $R_{DS(ON)}$ sensing, the replica device(s) passes a scaled current that is proportional to the current flow through the associated parallel power device. The scaled current may be used as the current source 202. The current $I_{CS(t)}$ from the current source 202 may be applied to a resistor $R_{CS}$ coupled to a reference voltage (e.g., circuit ground), resulting in a time-varying voltage $V_{R\_CS}$ at the node V as indicated by a symbolic saw-tooth waveform. The resistor $R_{CS}$ may be implemented in any convenient fashion that provides an impedance to the flow of current so as to generate a voltage drop across the resistor $R_{CS}$. Other circuits and methods known in the art may be used to provide the function of the current-to-voltage circuit 201 so as to generate a voltage $V_{R\_CS}$ at the node V that is proportional to the output current $I_{L(t)}$ of a coupled power stage.

In the illustrated example, two low-pass filters having different cutoff frequencies are coupled to the node V. More specifically, a first low-pass filter has a higher cutoff frequency and is designated in this disclosure as a "high-frequency filter" (HFF) 206, and a second low-pass filter has a lower cutoff frequency and is designated in this disclosure as a low-frequency filter (LFF) 208. As should be clear, "low" and "high" are relative to each other.

In the illustrated example, the HFF 206 includes a resistor $R_{HF}$ coupled between the node V and an output of the HFF 206, and a shunt capacitor $C_{HF}$ coupled between the output of the HFF 206 and a reference voltage (e.g., circuit ground). Similarly, the LFF 208 includes a resistor $R_{LF}$ coupled between the node V and an output of the LFF 208, and a shunt capacitor $C_{LF}$ coupled between the output of the LFF 208 and a reference voltage (e.g., circuit ground). As should be clear, other high-frequency and low-frequency low-pass filter circuit designs may be used to perform the same functions. For example, second-order and other higher-order filter circuits may be used for one or both of the HFF 206 or the LFF 208.

The purpose of the HFF 206 is to pass higher frequency (compared to the frequencies passed by the LFF 208) components of the time-varying voltage $V_{R\_CS}$ occurring at the node V, as suggested by the voltage waveform labeled $V_{CS\_HF}$, to a first input of an op-amp 204. Similarly, the purpose of the LFF 208 is to pass lower frequency (compared to the frequencies passed by the HFF 206) components of the time-varying voltage $V_{R\_CS}$ occurring at the node V, as suggested by the voltage waveform labeled $V_{CS\_LF}$, to a second input of the op-amp 204.

Figure 2B:
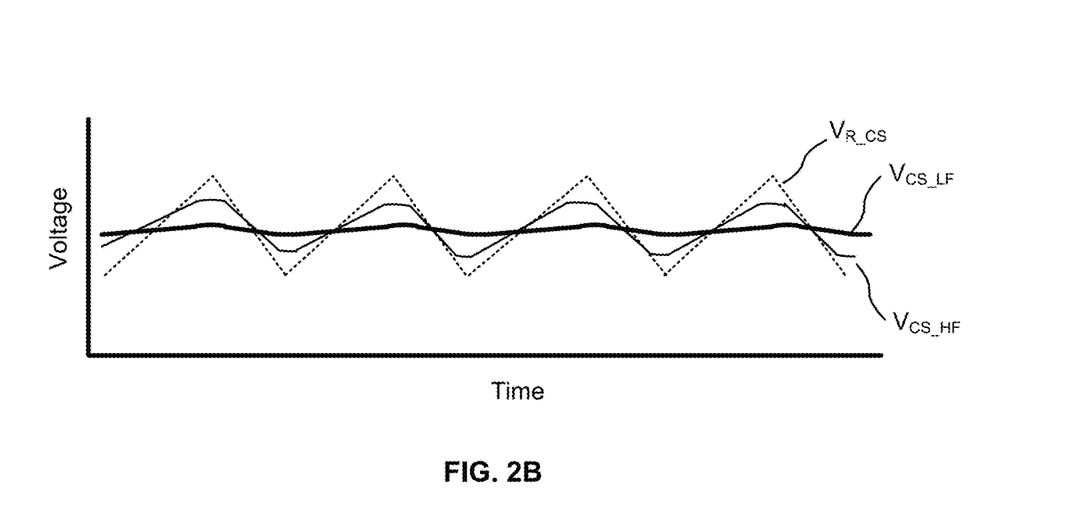
FIG. 2B is a graph showing examples of voltage versus time for $V_{R\_CS}$, $V_{CS\_HF}$, and $V_{CS\_LF}$.

For many embodiments, the equivalent resistance, $R_{LF}$, of the LFF 208 is set to be much higher than the resistance of resistor $R_{CS}$. The cutoff frequencies of the HFF 206 and the LFF 208 are determined by their respective R*C time constants. In the illustrated example, $R_{HF}*C_{HF} \ll R_{LF}*C_{LF}$ and thus the cut-off frequency of the HFF 206 is much higher than for the LFF 208. For example, in some applications, the cut-off frequency of the HFF 206 may be about 200-1000 kHz, while the cut-off frequency of the LFF 208 may be about 10 kHz. FIG. 2B is a graph showing examples of voltage versus time for $V_{R\_CS}$, $V_{CS\_HF}$, and $V_{CS\_LF}$. As the graph lines indicate, the output $V_{CS\_LF}$ of the LFF 208 varies little in magnitude over time relative to the magnitudes $V_{R\_CS}$ or $V_{CS\_HF}$.

As noted, the op-amp 204 is coupled to the outputs of the HFF 206 and the LFF 208. In some embodiments, the op-amp 204 may be configured to output a binary signal indicating whether $V_{CS\_LF}$ is momentarily higher or lower than $V_{CS\_HF}$. In some embodiments, the op-amp 204 may be configured to output an analog signal indicating the voltage differential between $V_{CS\_LF}$ and $V_{CS\_HF}$. The difference between $V_{CS\_LF}$ and $V_{CS\_HF}$ may be applied as an adjustment to the PWM duty cycle generated by a main control circuit controlling the switching pattern of the half-bridge power stage 102, as described in further detail below.

The output of the op-amp 204 may be coupled to a power converter control circuit, such as a PWM generator 112, and used to regulate the output of an associated power stage (e.g., a half-bridge power stage 102), for example, by altering the PWM signal duty cycle as a function of current sensed at the output of the associated power stage. Thus, sensed current that results in an increase in $V_{CS\_LF}$–$V_{CS\_HF}$ will generally increase the duty cycle of the power devices in the power stage in order to generate more output current. Conversely, sensed current that results in a decrease in $V_{CS\_LF}$–$V_{CS\_HF}$ will generally decrease the duty cycle of the power devices in the power stage in order to generate less output current. At steady state, the difference of $V_{CS\_LF}$–$V_{CS\_HF}$ generally has no net effect on the duty cycle that controls the regulation of a power stage.

Figure 2C:
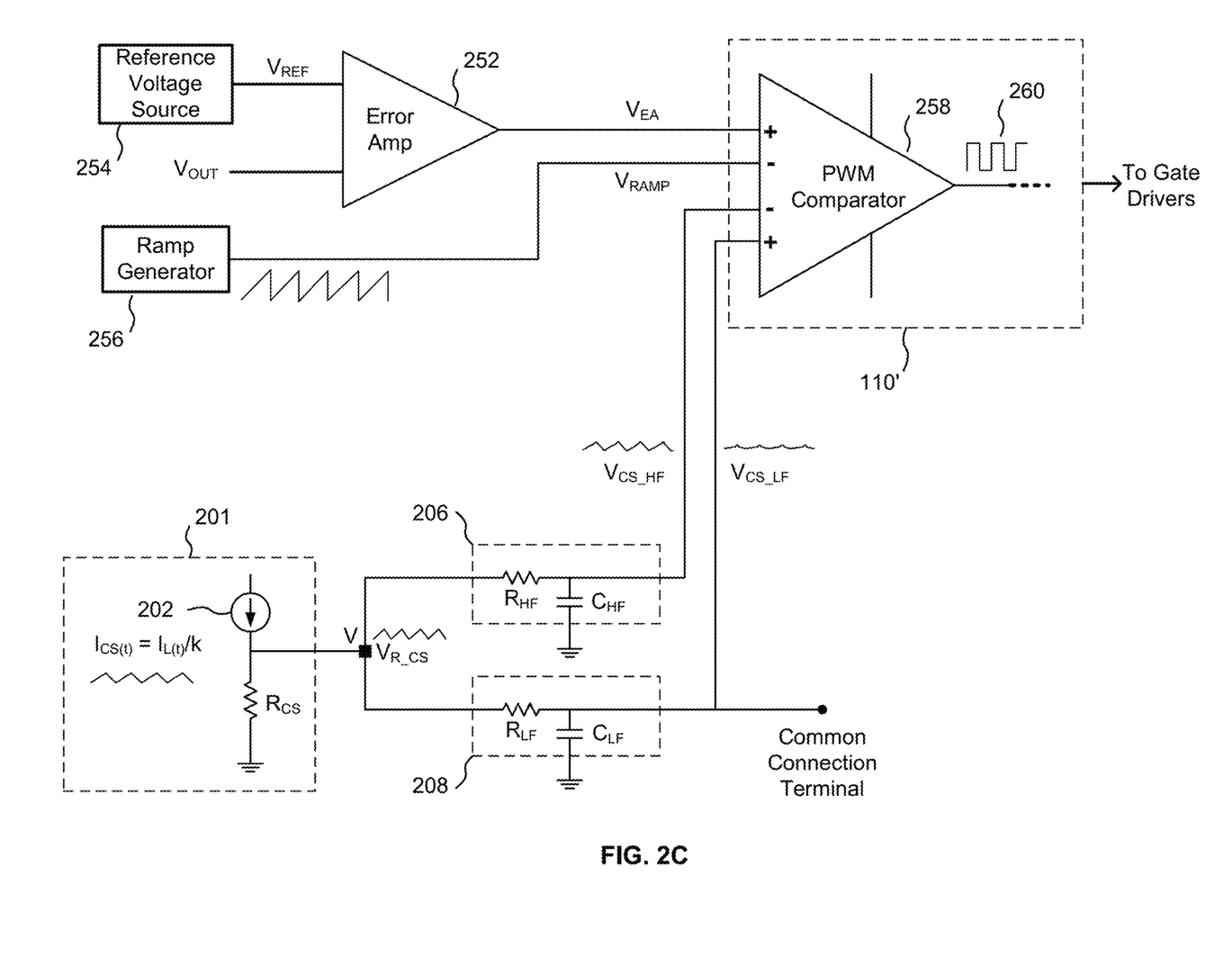
FIG. 2C is a schematic diagram of another embodiment of a novel output current sensing circuit for a power converter in which the outputs are directly coupled to a power converter control circuit.

In alternative embodiments, the respective outputs of the HFF 206 and the LFF 208 may be directly coupled to a power converter control circuit, with the function of the op-amp 204 being integrated within that control circuit, thus allowing omission of a distinct op-amp 204. For example, FIG. 2C is a schematic diagram of another embodiment of a novel output current sensing circuit for a power converter in which the outputs are directly coupled to a power converter control circuit. The illustrated example represents part of a voltage-mode PWM control circuit 110' with added current sensing signals $V_{CS\_HF}$ and $V_{CS\_LF}$ from, respectively, HFF 206 and LFF 208.

More specifically, the output voltage $V_{OUT}$ from a power stage of a power converter is compared by an error amplifier 252 to a reference voltage $V_{REF}$ from a reference voltage source 254. The output of the error amplifier 252, $V_{EA}$, along with the output $V_{RAMP}$ of a ramp generator 256, are applied as inputs to a PWM Comparator 258 within the PWM control circuit 110'. The PWM Comparator 258 generates a PWM output 260 that ultimately determines the switching patterns of the associated power stage. In general, the duty ratio of the PWM output 260 is mainly determined by the relation of $V_{EA}$ and $V_{RAMP}$—a larger value of $V_{EA}$ would yield a larger duty ratio.

In the illustrated example, additional inputs to the PWM Comparator 258 are $V_{CS\_HF}$ and $V_{CS\_LF}$ from, respectively, HFF 206 and LFF 208. The added inputs provide an adjustment to the duty ratio of the PWM output 260—the larger the difference of $V_{CS\_LF}$–$V_{CS\_HF}$, then the larger the duty ratio.

Multi-Phase Embodiments

The current sensing circuit 200 of FIG. 2A is useful in many applications in conjunction with a single power converter. However, the current sensing circuit 200 is particularly useful for achieving current balancing when used with a power converter architecture comprising multiple power converters or power stages coupled in parallel, sometimes called a multi-phase architecture (for purposes of this disclosure, parallel power converters and parallel power stages will both be considered to be a multi-phase architecture). The output $V_{CS\_LF}$ of the LFF 208 provides a slowly changing waveform that still reflects the output current of an associated power stage but without the consequent control loop issues that might occur if noise from the higher frequencies of the unfiltered voltage $V_{R\_CS}$ was included.

Figure 3A:
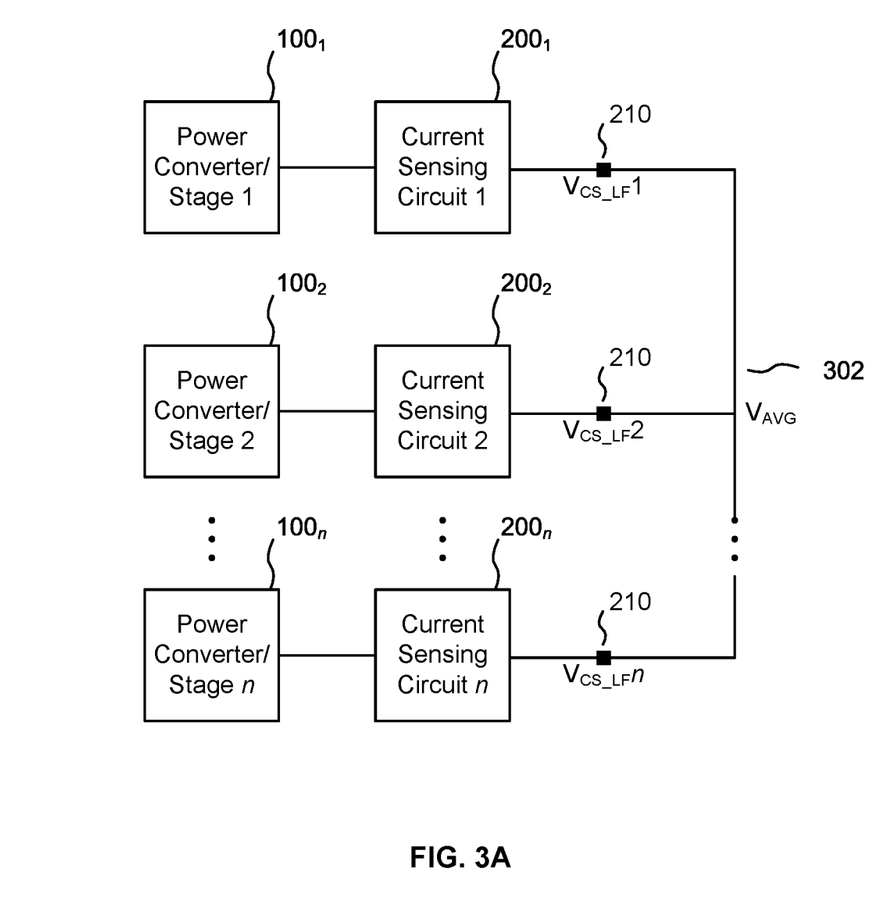
FIG. 3A is a block diagram of a set of n power converters 1 . . . n coupled in parallel, where n>1.

Referring back to FIG. 2A, the output of the LFF 208 of a current sensing circuit 200 may be made available as a common connection terminal 210 designed to be coupled to similar common connection terminals 210 of one or more parallel power converters or power stages. For example, FIG. 3A is a block diagram of a set of n power converters/stages $100_1$ ... $100_n$ coupled in parallel, where n>1. Each power converter/stage $100_1$ ... $100_n$ includes a corresponding current sensing circuit $200_1$ ... $200_n$, configured like the example current sensing circuit 200 shown in FIG. 2A. The common connection terminal 210 of each current sensing circuit $200_1$ ... $200_n$ is shown connected to a bus 302. Accordingly, the average voltage $V_{AVG}$ on the bus 302 equals $V_{CS\_LF}1 = V_{CS\_LF}2 = V_{CS\_LF}n$. Stated another way, $V_{AVG} = (V_{CS\_LF}1 + \ldots + V_{CS\_LF}n)/n$. Of note, $V_{AVG}$ represents the average output current $I_{AVG}$ of the n parallel power converters/stages.

Coupling the common connection terminals 210 of multiple current sensing circuits 200 alters the inputs to the respective comparators 204 of those current sensing circuits 200. That is, a particular op-amp 204 is no longer comparing the high frequencies of the voltage $V_{R\_CS}$ at the node V (i.e., $V_{CS\_HF}$) to the low frequencies of $V_{R\_CS}$ at the node V (i.e., $V_{CS\_LF}$). Instead, each op-amp 204 is comparing $V_{CS\_HF}$ (representative of the output current of the associated power converter/stage) against $V_{AVG}$ shared among all parallel current sensing circuits 200. Accordingly, for any current sensing circuit 200, if there is a difference in $V_{CS\_HF}$ relative to $V_{AVG}$ (equivalent to a difference in $I_{CS(t)}$ for that current sensing circuit 200 compared to the average output current $I_{AVG}$ of the n parallel power converters/stages), the respective op-amp 204 will output a control signal to the power converter control circuitry, such as a PWM generator 112, that may be used for correction of the output of the associated power converter/stage. For example, the control circuitry for a power converter/stage may be configured to either increase or decrease the output current of that power converter/stage until the $V_{CS\_HF}$ and $V_{CS\_LF}$ (=$V_{AVG}$) inputs to its op-amp 204 are again balanced in all devices in multi-phase configuration.

Figure 3B:
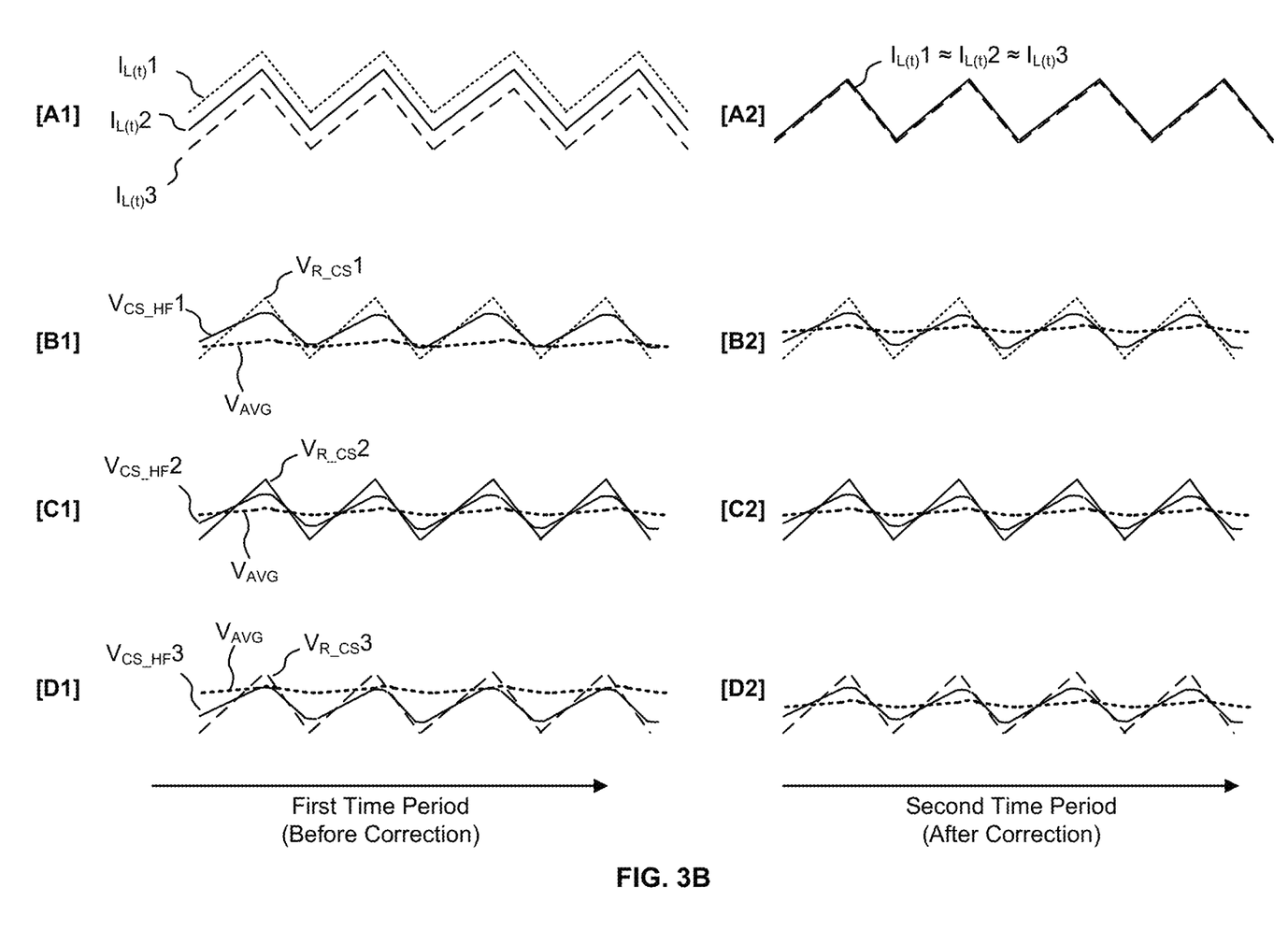
FIG. 3B is a set of graphs showing unbalanced outputs A1-D1 for three parallel power converters/stages and associated current sensing circuits during a first period of time, and rebalanced outputs A2-D2 during a second period of time.

As an example of how commonly-coupled multiple current sensing circuits 200 such as those shown in FIG. 3A may operate, FIG. 3B is a set of graphs showing unbalanced outputs A1-D1 for three parallel power converters/stages and associated current sensing circuits 200 during a first period of time, and rebalanced outputs A2-D2 during a second period of time.

Subgraph A1 shows the respective output currents $I_{L(t)}x$ of three parallel power con-verters/stages as sensed by the three corresponding parallel current sensing circuits 200 during a first period of time, with $I_{L(t)}1 > I_{L(t)}2 > I_{L(t)}3$ before correction. For example, $I_{L(t)}1$ may equal 0.5 A, $I_{L(t)}2$ may equal 1.0 A, and $I_{L(t)}3$ may equal 1.5 A. Accordingly, the output currents of the three power converters/stages are unbalanced.

Subgraph B1 shows $V_{AVG}$ compared to $V_{CS\_HF}$ and $V_{R\_CS}1$ of a first current sensing circuit, indicating that the average of $V_{CS\_HF}$ (and thus $V_{R\_CS}1$) for the first power converter/stage is greater than $V_{AVG}$. Accordingly, the output current $I_{L(t)}1$ of the first power converter/stage is high and needs correction downwards towards a balanced state.

Subgraph C1 shows $V_{AVG}$ compared to $V_{CS\_HF}2$ and $V_{R\_CS}2$ of a second current sensing circuit, indicating that the average of $V_{CH\_HF}2$ (and thus $V_{R\_CS}2$) for the second power con-verter/stage is about equal to $V_{AVG}$. Accordingly, the output current $I_{L(t)}2$ of the second power con-verter/stage is about equal to $I_{AVG}$ and no correction is needed.

Subgraph D1 shows $V_{AVG}$ compared to $V_{CS\_HF}3$ and $V_{R\_CS}3$ of a third current sensing circuit, indicating that the average of $V_{CS\_HF}3$ (and thus $V_{R\_CS}3$) for the third power converter/stage is less than $V_{AVG}$. Accordingly, the output current $I_{L(t)}3$ of the third power converter/stage is low and needs correction upwards towards a balanced state.

Subgraph A2 shows the respective output currents $I_{L(t)}x$ of the three parallel power con-verters/stages as sensed by the three parallel current sensing circuits 200 during a second period of time, with $I_{L(t)}1 \approx I_{L(t)}2 \approx I_{L(t)}3$ after correction (e.g., by altering the duty cycle of the PWM signals from the PWM generator for the respective power converters/stages). As shown, the output currents of the three corresponding power converters/stages are essentially balanced.

Subgraph B2 shows $V_{AVG}$ compared to $V_{CS\_HF}1$ and $V_{R\_CS}1$ of the first sensing circuit, indicating that, since the output current $I_{L(t)}1$ of the first power converter/stage has been reduced to a balanced state, the average of $V_{CS\_HF}1$ (and thus $V_{R\_CS}1$) for the first power converter/stage is about equal to $V_{AVG}$. The reduction in the output current $I_{L(t)}1$ of the first power converter/stage may be accomplished, for example, by reducing the duty ratio of the PWM signal to the first power converter/stage.

Subgraph C2 shows $V_{AVG}$ compared to $V_{CS\_HF}2$ and $V_{R\_CS}2$ of the second sensing circuit, indicating that the average of $V_{CS\_HF}2$ (and thus $V_{R\_CS}2$) for the second power converter/stage remains about equal to $V_{AVG}$. Accordingly, the output current $I_{L(t)}2$ of the second power con-verter/stage is about equal to $I_{AVG}$ and no correction was needed.

Subgraph D2 shows $V_{AVG}$ compared to $V_{CS\_HF}3$ and $V_{R\_CS}3$ of the third sensing circuit, indicating that, since the output current $I_{L(t)}3$ of the third power converter/stage has been increased to a balanced state, the average of $V_{CS\_HF}3$ (and thus $V_{R\_CS}3$) for the third power converter/stage is about equal to $V_{AVG}$. The increase in the output current $I_{L(t)}3$ of the third power converter/stage may be accomplished, for example, by increasing the duty ratio of the PWM signal to the third power converter/stage.

Reconfigurability of Parallel Current Sensing Circuits

FIG. 3A shows an example of a parallel power converters/stages $100_1 \ldots 100_n$ and associated parallel current sensing circuits $200_1 \ldots 200_n$ hardwired to a common bus 302. In some embodiments, it may be especially useful to provide for reconfigurability of the parallel current sensing circuits $200_1 \ldots 200_n$ so that integrated circuit (IC) embodiments of such power converters/stages and associated current sensing circuits may be configured in multiple ways for different applications. Thus, instead of requiring differently configured ICs for different applications, the reconfigurability afforded by this aspect of the invention allows a user to program the type of configuration necessary to deliver a specified power level.

Figure 4:
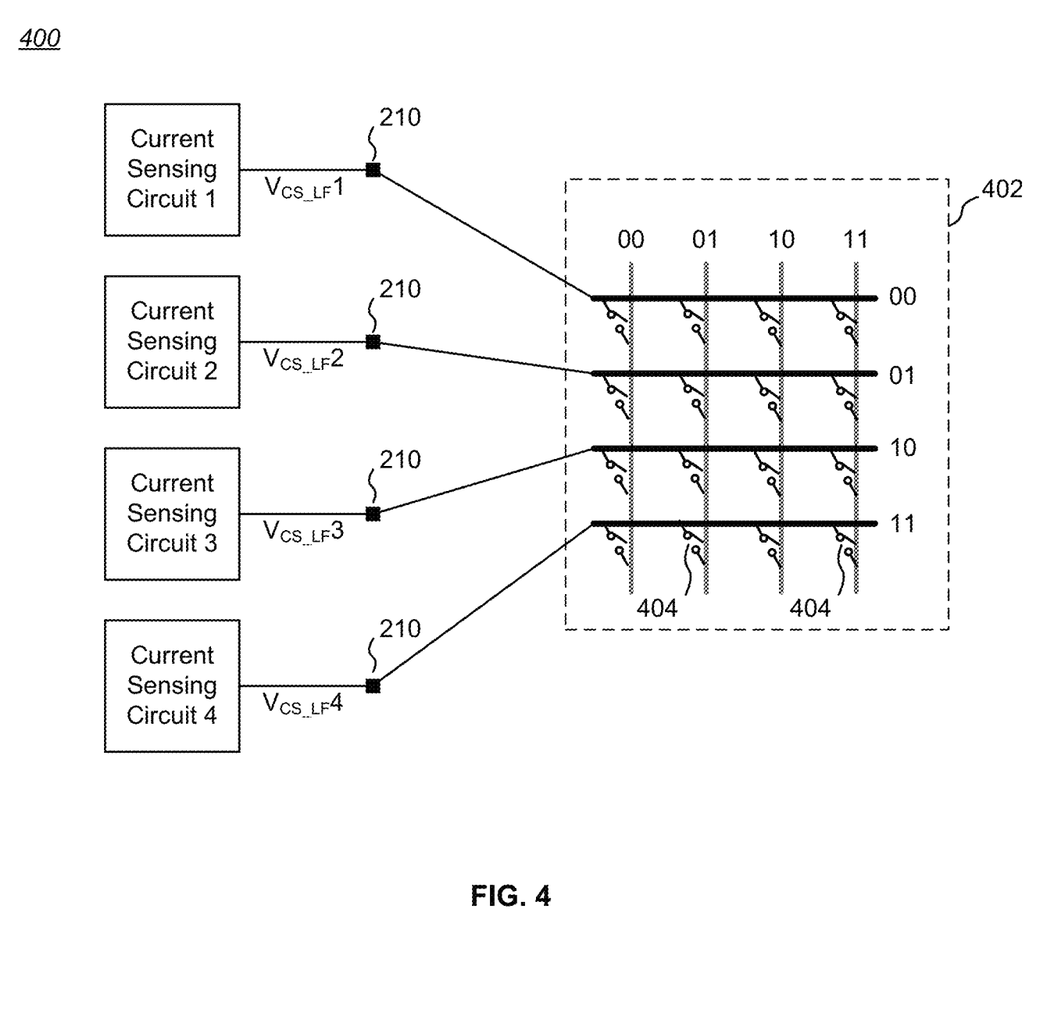
FIG. 4 is a block diagram of one example of a set of parallel current sensing circuits and a stylized switch array that provides reconfigurability of the connections among the set.

FIG. 4 is a block diagram 400 of one example of a set of parallel current sensing circuits and a stylized switch array 402 that provides reconfigurability of the connections among the set. In the illustrated example, the common connection terminals 210 of four parallel current sensing circuits 1 . . . 4 are coupled to corresponding horizontal conductors 00-11 of the switch array 402. The switch array 402 includes a plurality of switches 404 (not all switches have reference numbers, to avoid clutter) that may be selectively set, in known fashion, to a CLOSED state having a low resistance (e.g., less than ~1 kΩ) or an OPEN state having a high resistance (e.g., more than ~1000 kΩ). A CLOSED switch 404 connects a horizontal conductor 00-11 to a vertical conductor 00-11. As should be clear, the switch array 402 allows any horizontal conductor 00-11 to be coupled to any vertical conductor 00-11. The switch array 402 architecture shown in FIG. 4 may be extended for use with fewer or more than four parallel current sensing circuits.

FIG. 4 shows all switches 404 as OPEN for purposes of illustration only. FIGS. 5A-5E are block diagrams of example configurations of the set of parallel current sensing circuits and the stylized switch array of FIG. 4. Each configuration shows CLOSED switch settings that tie together from zero to all common connection terminals 210 of four (by way of example) current sensing circuits of the type shown in FIG. 2A (OPEN switches are not shown to avoid clutter). As should be appreciated, tying common connection terminals 210 also requires ganging the outputs of the corresponding power converters/stages in order to supply and control the selected amounts of current output. In the illustrated examples, it is assumed that each power converter/stage is capable of supplying 4A of output current.

Figure 5A:
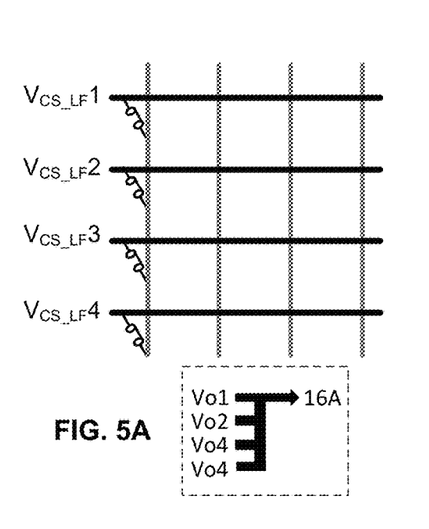
FIGS. 5A-5E are block diagrams of example configurations of the set of parallel current sensing circuits and the stylized switch array of FIG. 4.

In FIG. 5A, all common connection terminals 210 (corresponding to the voltages $V_{CS\_LF}x$ of 4 respective parallel current sensing circuits 200) are ganged together and thus can control and balance 4 corresponding power converters/stages to deliver 16 A of combined output current.

Figure 5B:
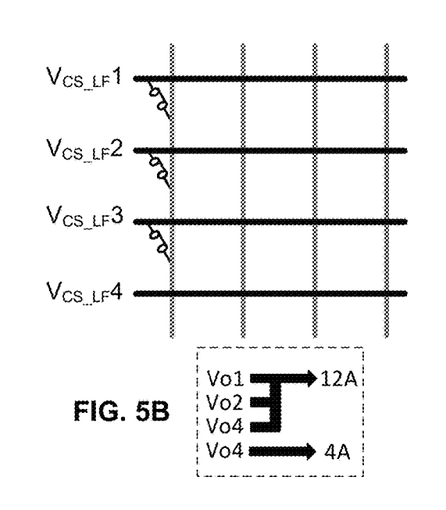

In FIG. 5B, 3 of 4 common connection terminals 210 are ganged together and thus can control and balance 3 corresponding power converters/stages to deliver 12 A of combined output current. The remaining current sensing circuit 200 (corresponding to the voltage $V_{CS\_LF}4$) can independently control its corresponding power converter/stage to deliver 4 A of output current.

Figure 5C:
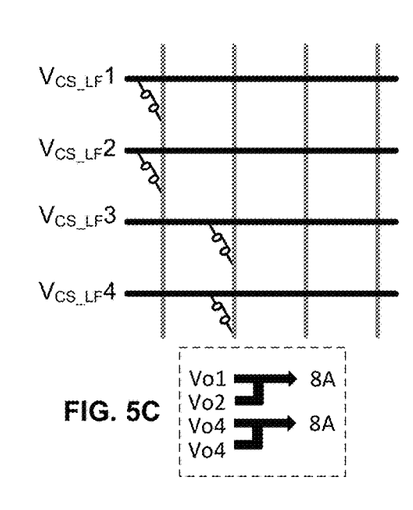

In FIG. 5C, 2 pairs of 2 common connection terminals 210 are ganged together and thus can control and balance 2 pairs of corresponding power converters/stages, with each pair delivering 8 A of combined output current.

Figure 5D:
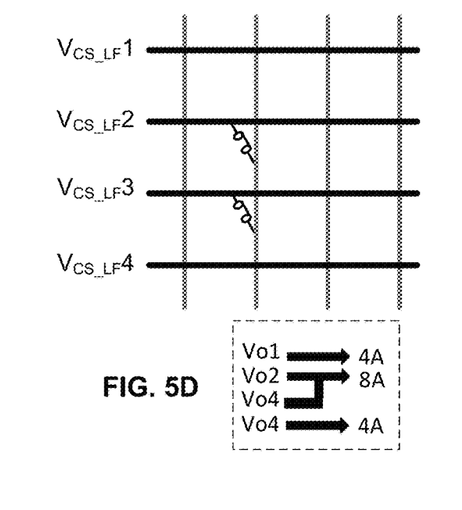

In FIG. 5D, 2 of 4 common connection terminals 210 are ganged together and thus can control and balance 2 corresponding power converters/stages to deliver 8 A of combined output current. Each remaining current sensing circuit 200 (corresponding to the respective voltages $V_{CS\_LF}1$ and $V_{CS\_LF}4$ in this example) can independently control its corresponding power con-verter/stage and deliver 4 A of output current.

Figure 5E:
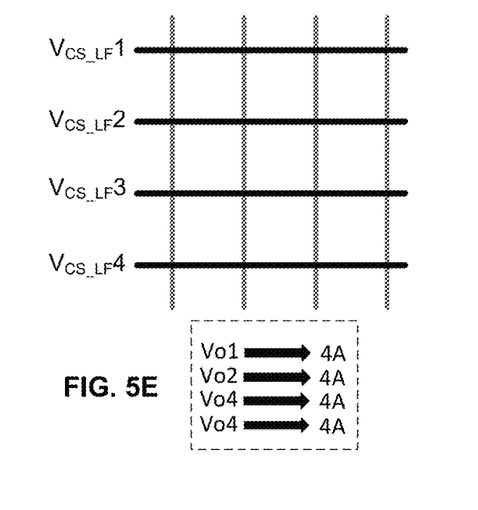

In FIG. 5E, none of the common connection terminals 210 are ganged together, and thus each current sensing circuit 200 can independently control its corresponding power converter/stage and deliver 4 A of output current.

As should be clear from FIGS. 5 A-5E, use of a switch array 402 greatly increases the flexibility of using integrated circuit embodiments of the present invention to meet the needs of different applications.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 6:
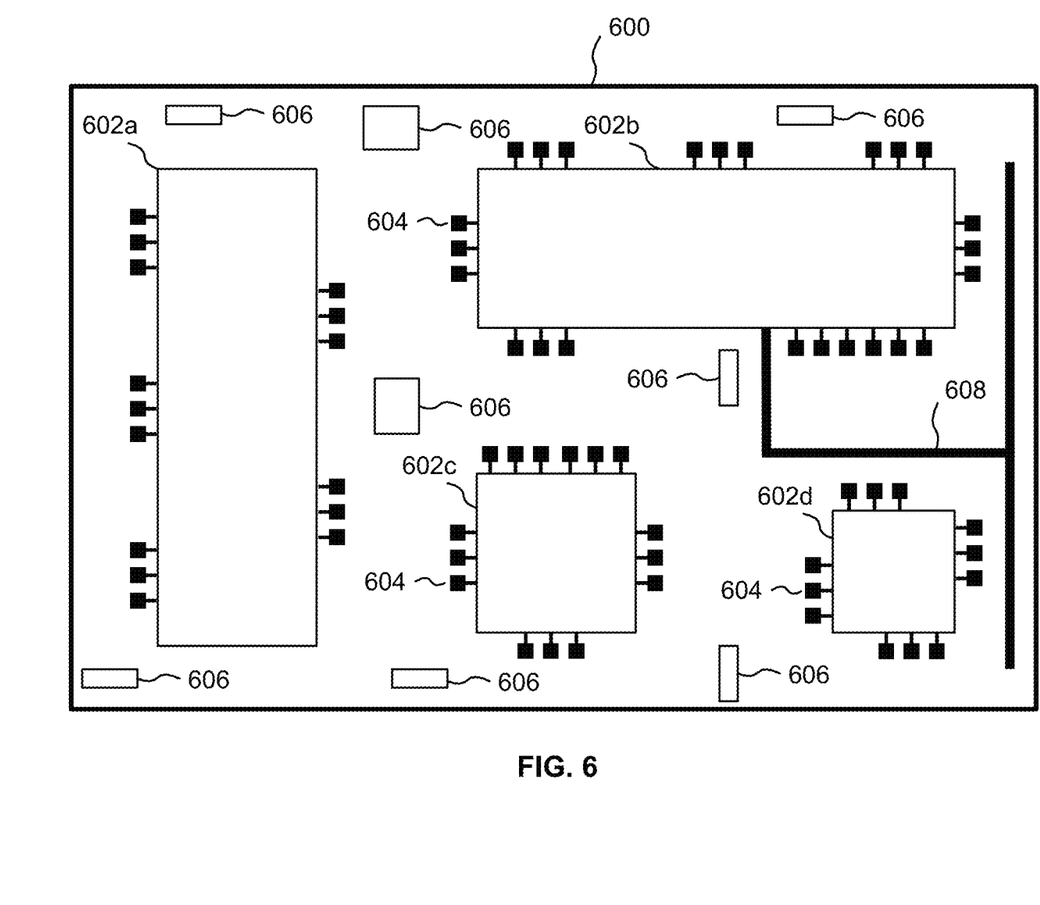
FIG. 6 is a top plan view of a substrate that may be, for example, a printed circuit board or chip module substrate (e.g., a thin-film tile).

As one example of further integration of embodiments of the present invention with other components, FIG. 6 is a top plan view of a substrate 600 that may be, for example, a printed circuit board or chip module substrate (e.g., a thin-film tile). In the illustrated example, the substrate 600 includes multiple ICs 602a-602d having terminal pads 604 which would be interconnected by conductive vias and/or traces on and/or within the substrate 600 or on the opposite (back) surface of the substrate 600 (to avoid clutter, the surface conductive traces are not shown and not all terminal pads are labelled). The ICs 602a-602d may embody, for example, signal switches, active filters, amplifiers (including one or more LNAs), and other circuitry. For example, IC 602b may incorporate one or more instances of a power converter circuit with a current sensing circuit like the circuit shown in FIG. 2A.

The substrate 600 may also include one or more passive devices 606 embedded in, formed on, and/or affixed to the substrate 600. While shown as generic rectangles, the passive devices 606 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 600 to other passive devices 606 and/or the individual ICs 602a-602d.

The front or back surface of the substrate 600 may be used as a location for the formation of other structures. For example, one or more antennae may be formed on or affixed to the front or back surface of the substrate 600; one example of a front-surface antenna 608 is shown, coupled to an IC die 602b, which may include RF front-end circuitry. Thus, by including one or more antennae on the substrate 600, a complete radio may be created.

Methods

Figure 7:
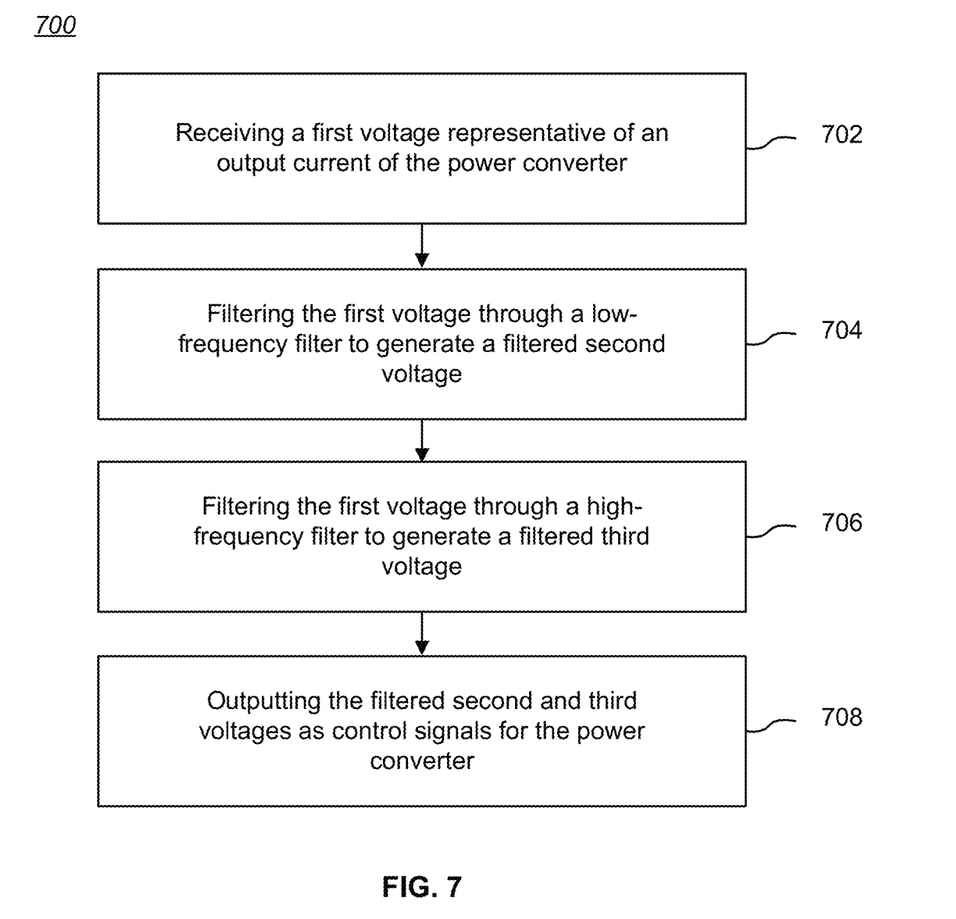
FIG. 7 is a process flow chart showing a first method for generating a control signal for a power converter.

Another aspect of the invention includes methods for controlling a power converter. For example, FIG. 7 is a process flow chart 700 showing a first method for generating a control signal for a power converter. The method includes receiving a first voltage representative of an output current of the power converter [Block 702]; passing the first voltage through a low-frequency filter to generate a filtered second voltage [Block 704]; passing the first voltage through a high-frequency filter to generate a filtered third voltage [Block 706]; and outputting the filtered second and third voltages as control signals for the power converter [Block 708].

Figure 8:
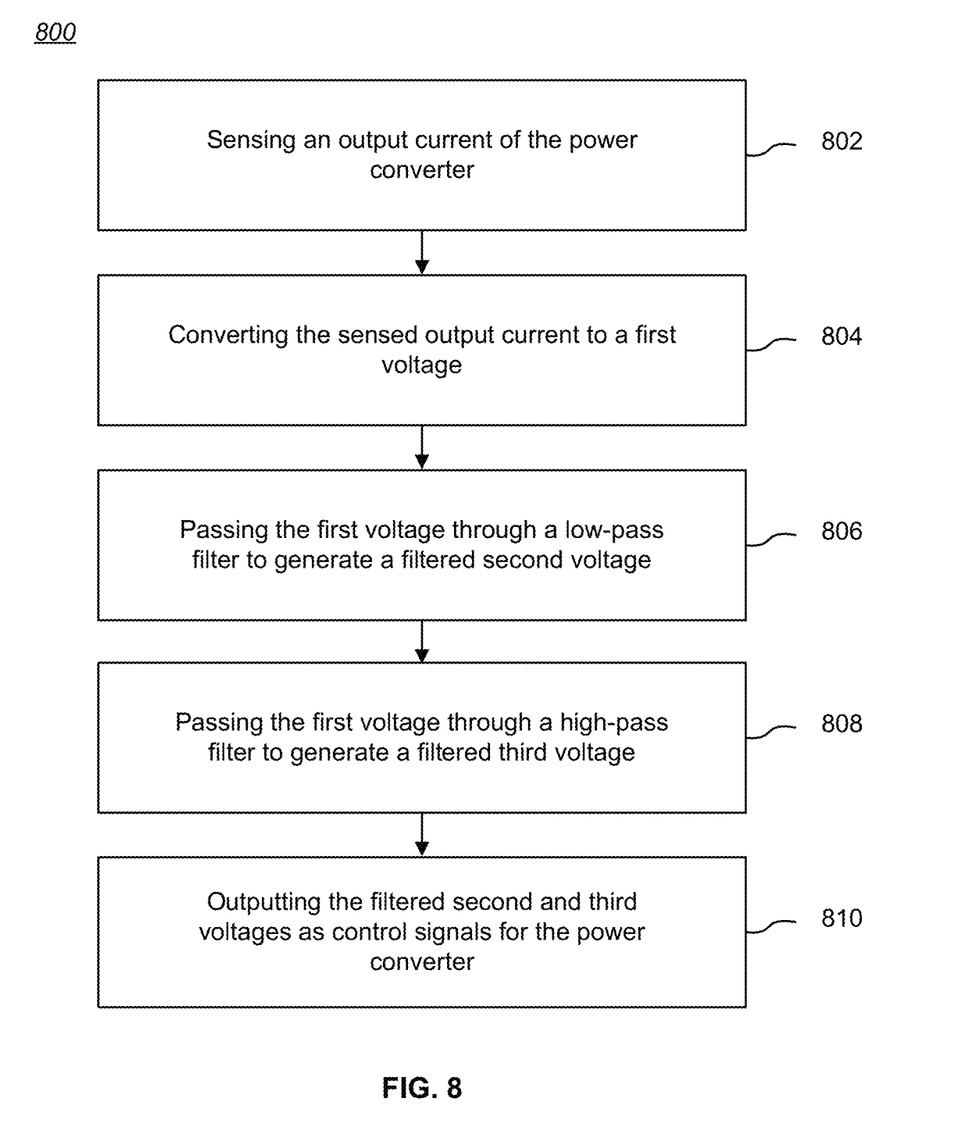
FIG. 8 is a process flow chart showing a second method for generating a control signal for a power converter.

As another example, FIG. 8 is a process flow chart 800 showing a second method for generating a control signal for a power converter. The method includes sensing an output current of the power converter [Block 802]; converting the sensed output current to a first voltage [Block 804]; passing the first voltage through a low-frequency filter to generate a filtered second voltage [Block 806]; passing the first voltage through a high-frequency filter to generate a filtered third voltage [Block 808]; and outputting the filtered second and third voltages as control signals for the power converter [Block 810].

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a mini-mum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A power converter including:
   (a) a plurality of power stages each configured to output a current in response to control signals; and
   (b) a plurality of current sensing circuits, each coupled to a respective power stage and each including:
      (1) a current-to-voltage circuit configured to provide a first voltage at an output node, the first voltage being proportional to an output current of the power converter;
      (2) a low-pass low-frequency filter having an input connected to the output node of the current-to-voltage circuit and an output configured to provide a filtered second voltage from the first voltage as a first control signal for the respective power stage; and
      (3) a low-pass high-frequency filter having an input connected to the output node of the current-to-voltage circuit and an output configured to provide a filtered third voltage from the first voltage as a second control signal for the respective power stage;
   wherein the outputs of the low-pass low-frequency filters of the plurality of current sensing circuits are coupled in common.

2. The power converter of claim 1, wherein the current-to-voltage circuit includes:
   (a) a current source configured to provide an output current proportional to the output current of the respective power stage; and
   (b) an impedance coupled between the current source and a first reference voltage, for converting the output current of the current source to the first voltage at the node.

3. The power converter of claim 1, wherein each current sensing circuit further includes a comparator having a first input coupled to receive the second voltage from the output of the low-pass low-frequency filter, a second input coupled to receive the third voltage from the output of the low-pass high-frequency filter, and an output representing a difference between the second voltage and the third voltage.

4. The power converter of claim 1, wherein at least one of the plurality of low-pass low-frequency filters includes a resistor coupled between the input of the at least one low-pass low-frequency filter and the output of the at least one low-pass low-frequency filter, and a capacitor coupled between the output of the at least one low-pass low-frequency filter and a second reference voltage.

5. The power converter of claim 1, wherein at least one of the plurality of low-pass high-frequency filters includes a resistor coupled between the input of the at least one low-pass high-frequency filter and the output of the at least one low-pass high-frequency filter, and a capacitor coupled between the output of the at least one low-pass high-frequency filter and a second reference voltage.

6. The power converter of claim 1, wherein:
   (a) at least one of the plurality of low-pass low-frequency filters includes a resistor coupled between the input of the at least one low-pass low-frequency filter and the output of the at least one low-pass low-frequency filter, and a capacitor coupled between the output of the low-pass low-frequency filter and a second reference voltage; and
   (b) at least one of the plurality of low-pass high-frequency filter includes a resistor coupled between the input of the at least one low-pass high-frequency filter and the output of the at least one low-pass high-frequency filter, and a capacitor coupled between the output of the at least one low-pass high-frequency filter and the second reference voltage.

7. The power converter of claim 1, wherein the outputs of the low-pass low-frequency filters of the plurality of current sensing circuits are selectively couplable in common through a switch array.

8. A power converter including:
   (a) a plurality of power stages each configured to output a current in response to control signals;
   (b) a plurality of current sensing circuits, each coupled to a respective power stage and each including:
      (1) a current source configured to provide an output current proportional to the current output by the respective power stage;
      (2) an impedance coupled between the current source and a first reference voltage, for converting the output current of the current source to a first voltage at a node;
      (3) a low-pass low-frequency filter having an input connected to the node of the impedance and an output configured to provide a filtered second voltage from the first voltage;
      (4) a low-pass high-frequency filter having an input connected to the node of the impedance and an output configured to provide a filtered third voltage from the first voltage; and
      (5) a comparator having a first input coupled to receive the second voltage from the output of the low-pass low-frequency filter, a second input coupled to receive the third voltage from the output of the low-pass high-frequency filter, and an output representing a difference between the second voltage and the third voltage, wherein the output of the comparator is provided as a control signal for the respective power stage; and
   (c) a switch array configured to couple selected outputs of the low-pass low-frequency filters of the plurality of current sensing circuits.

9. The power converter of claim 8, wherein at least one of the plurality of low-pass low-frequency filters includes a resistor coupled between the input of the at least one low-pass low-frequency filter and the output of the at least one low-pass low-frequency filter, and a capacitor coupled between the output of the at least one low-pass low-frequency filter and a second reference voltage.

10. The power converter of claim 8, wherein at least one of the plurality of low-pass high-frequency filters includes a resistor coupled between the input of the at least one low-pass high-frequency filter and the output of the at least one low-pass high-frequency filter, and a capacitor coupled between the output of the at least one low-pass high-frequency filter and a second reference voltage.

11. The power converter of claim 8, wherein:
  (a) at least one of the plurality of low-pass low-frequency filters includes a resistor coupled between the input of the at least one low-pass low-frequency filter and an output of the at least one low-pass low-frequency filter, and a capacitor coupled between the output of the low-pass low-frequency filter and a second reference voltage; and
  (b) at least one of the plurality of low-pass high-frequency filter includes a resistor coupled between the input of the at least one low-pass high-frequency filter and an output of the at least one low-pass high-frequency filter, and a capacitor coupled between the output of the at least one low-pass high-frequency filter and the second reference voltage.

12. A method of generating a control signal for a power converter including a plurality of power stages each configured to output a current in response to control signals, the method including:
  (a) sensing an output current of each of the plurality of power stages of the power converter;
  (b) for each of the plurality of power stages of the power converter:
    (1) converting the sensed output current of the power stage to a first voltage at a node;
    (2) passing the first voltage at the node through an input of a low-pass low-frequency filter to generate a filtered second voltage;
    (3) passing the first voltage at the node through an input of a low-pass high-frequency filter to generate a filtered third voltage; and
    (4) outputting the filtered second and third voltages as control signals for the power converter; and
  (c) coupling the outputs of the low-pass low-frequency filters in common.

* * * * *

UNITED STATES PATENT AND TRADEMARK OFFICE
CERTIFICATE OF CORRECTION

| | | |
|---|---|---|
| PATENT NO. | : 12,283,876 B2 | Page 1 of 1 |
| APPLICATION NO. | : 17/679572 | |
| DATED | : April 22, 2025 | |
| INVENTOR(S) | : Tim Wen Hui Yu and Gregory Szczeszynski | |

It is certified that error appears in the above-identified patent and that said Letters Patent is hereby corrected as shown below:

In the Specification

In the BACKGROUND:

Column 2, Line 18, change "may en-compass" to --may encompass--.

In the DESCRIPTION OF THE DRAWINGS:

Column 3, Line 18, change "where$n>1$." to --where $n>1$.--.

In the DETAILED DESCRIPTION:

Column 6, Line 28, change "con-verter/stage)" to --converter/stage)--.

Column 6, Line 51, change "con-verters/stages" to --converters/stages--.

Column 6, Line 67, change "con-verter/stage" to --converter/stage--.

Column 7, Line 1, change "con-verter/stage" to --converter/stage--.

Column 7, Line 30, change "con-verter/stage" to --converter/stage--.

Column 8, Line 43, change "con-verter/stage" to --converter/stage--.

Column 10, Line 52, change "at a mini-mum," to --at a minimum,--.

Signed and Sealed this
Twenty-seventh Day of May, 2025

Coke Morgan Stewart
*Acting Director of the United States Patent and Trademark Office*